United States Patent
Conley

Patent Number: 5,543,091
Date of Patent: Aug. 6, 1996

[54] FOAM PROCESS OF RESTORING DEPRESSIONS IN CARPET

[76] Inventor: Jeffery R. Conley, 37 Via Brida, Rancho Santa Margarita, Calif. 92688

[21] Appl. No.: 292,431

[22] Filed: Aug. 18, 1994

[51] Int. Cl.⁶ .................................. B32B 35/00
[52] U.S. Cl. .......................... 264/36; 156/94; 428/63
[58] Field of Search ............ 156/94, 98; 264/36, 264/46.4, 46.5; 428/63

[56] References Cited

U.S. PATENT DOCUMENTS

| | | | |
|---|---|---|---|
| 2,320,425 | 6/1943 | Glaes | 264/36 |
| 3,211,813 | 10/1965 | Behrendt | 264/36 |
| 4,033,395 | 7/1977 | Berg | 264/46.1 |
| 4,058,423 | 11/1977 | Bascom et al. | 156/98 |
| 4,911,773 | 3/1990 | Leighton | 156/94 |
| 4,917,745 | 4/1990 | Speer | 156/94 |
| 4,955,544 | 9/1990 | Kopp | 239/413 |

FOREIGN PATENT DOCUMENTS

| | | | |
|---|---|---|---|
| 57-212037 | 12/1982 | Japan | 264/36 |
| 63-154332 | 6/1988 | Japan | 264/36 |

*Primary Examiner*—Michael W. Ball
*Assistant Examiner*—Daniel J. Stemmer

[57] ABSTRACT

A method of restoring carpet with a foam backing which has developed depressions from having a heavy object placed upon it. Plastic liquid foam is injected into these dented areas and cures to restore a planer surface to the carpet.

2 Claims, 2 Drawing Sheets

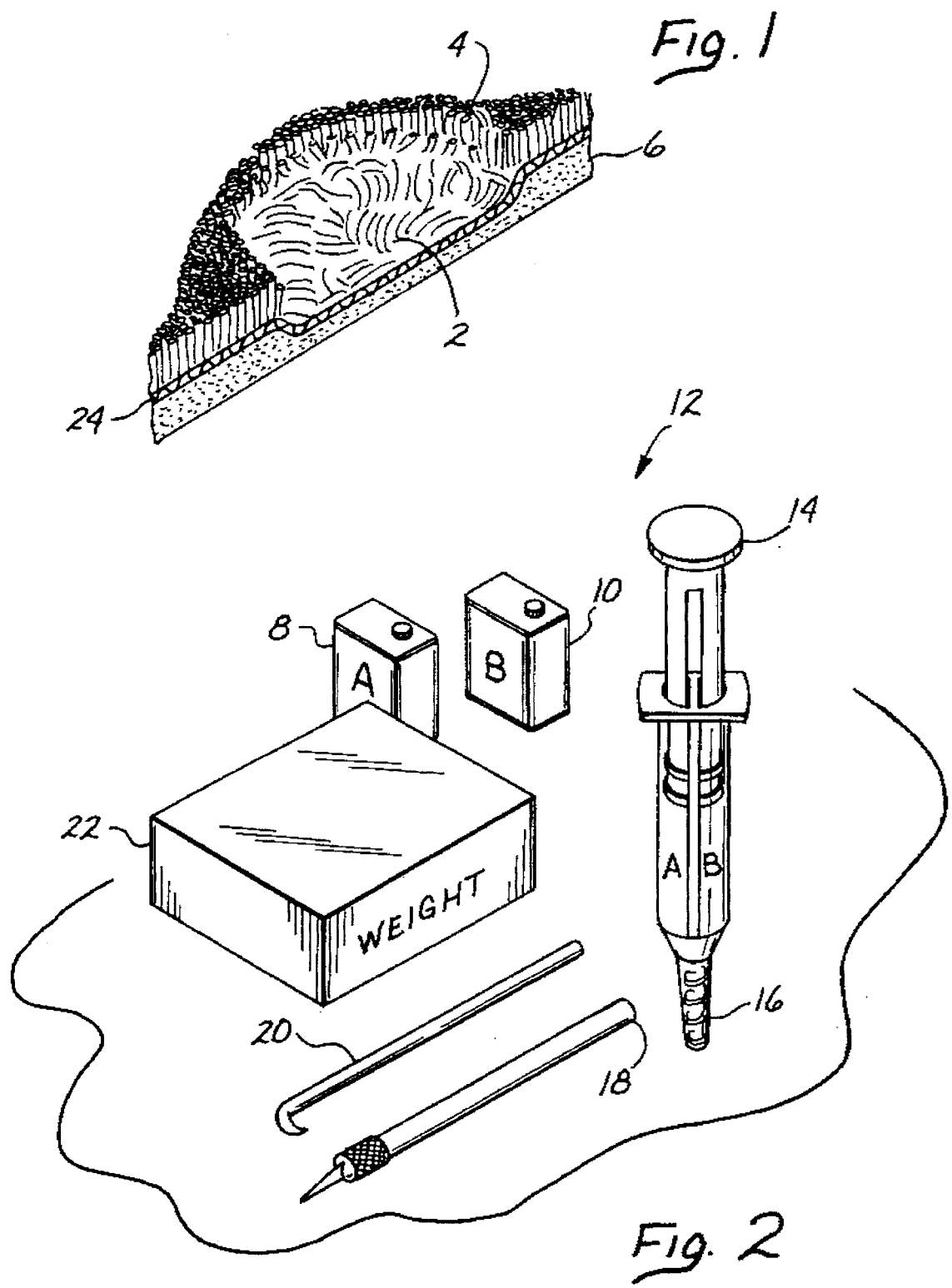

5,543,091

FOAM PROCESS OF RESTORING DEPRESSIONS IN CARPET

FIELD OF THE INVENTION

This invention relates to repairing depressions in carpet. More particularly, the invention has application to filling the void space in carpet depressions caused by heavy objects such as furniture.

PRIOR ART

Quite a number of techniques have been employed in an attempt to repair depressions in carpet. These attempts have been made by those skilled in the art as well as those who are not. These attempts include applying steam or ice cubes to the depressions in carpet and have been unsuccessful in completely restoring the carpet to its original condition. The cause of the depressions are as follows: Heavy objects placed on the carpet leave deep depressions from stretching the backing of the carpet as well as making a permanent depression in the carpet padding. Quite often during redecorating or moving from one home to another, furniture is removed from the carpet after having been in the same place for a lengthy period of time. The legs or frame of the furniture then leave deep depressions in the carpet once they are moved from their original spot. These depressions are unattractive and are often covered up by placing a potted plant, area rug, or another piece of furniture over them. In some cases, perfectly good carpet is replaced because of these depressions.

SUMMARY OF THE INVENTION

An object of this invention is to provide an improved process for repairing depressions in carpet by injecting liquid plastic foam in between the carpet and the carpet padding centered in the middle of the depression. In doing this, the depressed carpet has support under it and the void in the carpet padding is filled with the plastic liquid foam leaving the carpet with a level surface once again. The polyurethane foam is the most ideal material to inject as that is what most carpet padding is made of. This process leaves the once depressed carpet feeling soft and natural to look at and walk on.

An object of this invention is to provide a method of restoring depressions in an installed foam padding backing adjacent to an installed carpet where the method comprises introducing plastic liquid foam between the installed carpet and the padding in the area of the depression wherein said foam expands to fill the area between the carpet and the depression in the foam padding thereby providing a level foam padding backing and said foam bonds to the foam padding thereby holding itself in place.

Another object of this invention is to provide a method of restoring depressions in an installed foam padding backing adjacent to an installed carpet where the method comprises the steps of: establishing the size of said depression requiring repair; making an incision in the installed carpet in the area to be repaired; admixing two components of a two-component foam in a syringe device and injecting the mixed components between the carpet and the padding in the area of the depression; and restraining the foam resulting from said admixture by placing a weight over the center of said depression, wherein said restrained foam expands to fill the area between the carpet and the depression in the foam padding thereby providing a level foam padding backing and said foam bonds to the foam padding thereby holding itself in place.

The present invention allows for quick and economical repair of depressions in carpet by utilizing on site mixing of polyurethane foam plastic and a few simple tools all of which can be procured in kit form or improvised. Even more significant, the repair material is adhesively attached to the edges of the existing foam, and thus bonding will not allow it to be dislodged from its position in the depression.

The description of the invention which follows, together with the accompanying drawings should not be construed as limiting the invention to specifically the example shown and described, because those skilled in the art to which the invention appertains will be able to devise other forms within the ambit of the appended claims.

FIG. 1 is a perspective view of carpet with a depression including a depression in the foam padding underneath the carpet.

FIG. 2 is a perspective view of the components recommended to be supplied in two forms of carpet repair kits.

Preliminary to the detailed explanation of the inventive procedure for making depression repairs in carpet, a material used in this application will be described. Expandable liquid polyurethane foam has found use in an ever increasing number of industries. In this application, equal amounts of two fluid components are poured into a double sided syringe and injected through a plastic spiral mixing tip which is attached onto the syringe. Measured quantities used are based on the volume of the void to be filled and a knowledge that the finished sponge-like foam has a volume approximately twenty times that of the component fluid mixture. When injecting the components, equal amounts of A and B are poured into a syringe. After the component fluid A and B are mixed, a reaction results in rapid formation of bubbles which expand to a sponge foam plastic, taking the shape of the depression when injected directly into the depression. The foam cannot travel to other areas under the carpet because it is surrounded by existing foam. The liquid foam levels off once it reaches the carpet because a flat weight approximately ten times the size of the depression is placed on top of the carpet and is centered directly over the depression for approximately ten minutes.

In FIG. 1 is shown a depression __2__ of random shape in carpet __4__ and foam padding __6__ in need of repair. To repair depression __2__ a kit __12__ (FIG. 2) is procured which contains the two fluid components of polyurethane foam producing fluids previously referred to as A and B and respectively identified as __8__ and __10__ and a double sided syringe __14__ for the purpose of keeping fluids A and B separate until injecting fluids A and B to make foam. Fluid containers for components A and B can be conventional screw top cans or tubes to suit. A plastic tip __16__ which attaches to syringe __14__ has a spiral inside for the purpose of mixing the two fluids A and B. Also shown in FIG. 2 is an exacto knife __18__ for the purpose of making a slight incision in the carpet backing __24__ directly in the middle of the depression __2__. This incision is where the syringe __14__ will be placed to inject the liquid foams A and B. A hook __20__, for raising the depressed carpet __2__, with the void between the carpet and existing foam __6__ is where the foam will be cured. A weight __22__ approximately ten times the size of the depression will be placed directly over the depression _2_ thus allowing foam _32_ to rise to a level even with the rest of the carpet.

Figure 3:
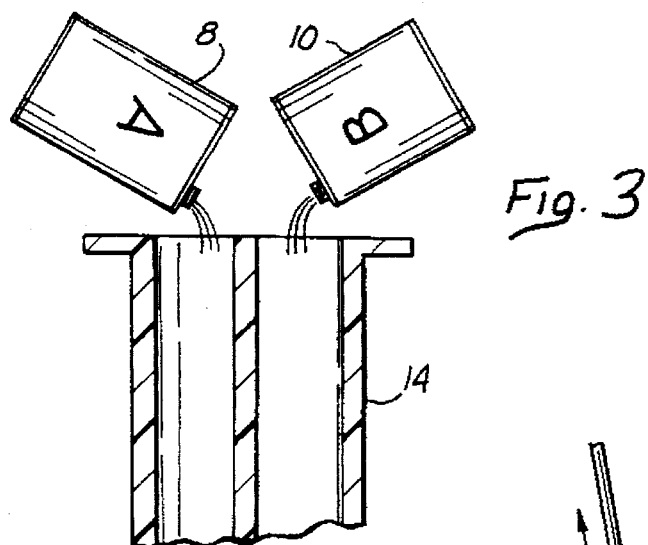
FIG. 3 is a view of the mixing techniques required to prepare the polyurethane foam components.

At this point, it will be understood that the depression _2_ has been prepared for repair and an estimate of its volume is required. In FIG. 3 is shown the foam components being poured into a syringe _14_. Enough of each foam component A and B should be used to make approximately ¼ the volume of the depression _2_.

Figure 4A:
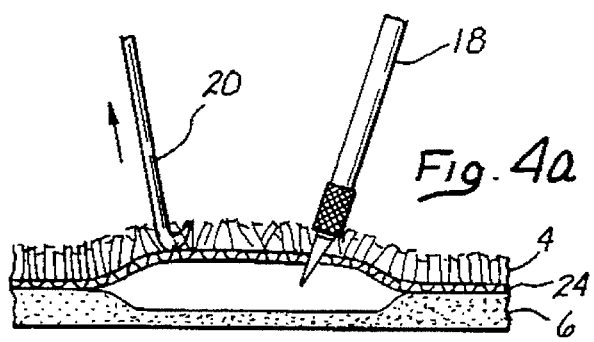
FIGS. 4a–4d are a series of sectional views on performing this carpet restoration process.

FIG. 4A Preparing the depression _2_ by pulling up with a hook _20_ and simultaneously making a slight incision with an exacto knife _18_ in the center of the depression _2_.

Figure 4B:
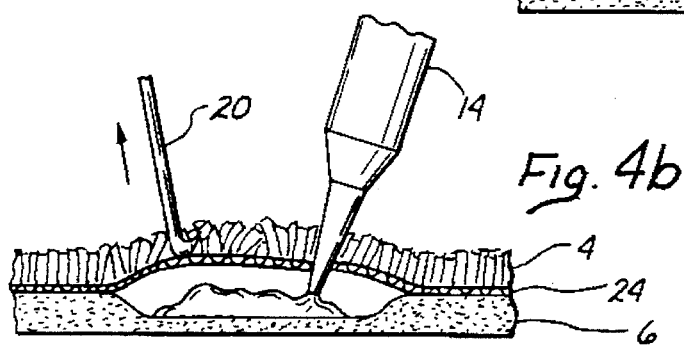

FIG. 4B Injecting liquid foam A and B simultaneously through a plastic spiral mixing tip _16_ as mix 34 transforms into a foam mass.

Figure 4C:
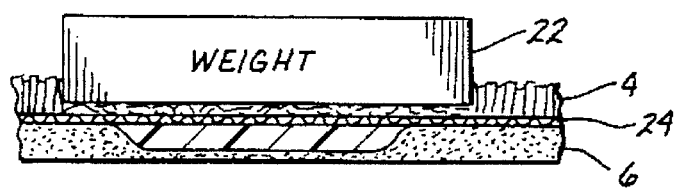

FIG. 4C Remove syringe _14_ and apply weight _22_ directly over depression _2_. Allow to cure for five to seven minutes.

Figure 4D:
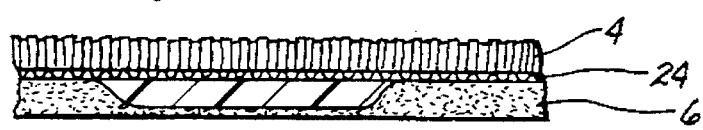

FIG. 4D shows the finished repair after weight has been removed and surface _30_ has been restored to its original form.

What is claimed is:

1. A method of restoring depressions in an installed foam padding backing adjacent to an installed carpet, said method comprising introducing plastic liquid foam between the installed carpet and the padding in the area of the depression, wherein said foam expands to fill the area between the carpet and the depression in the foam padding thereby providing a level foam padding backing and said foam bonds to the foam padding thereby holding itself in place.

2. A method of restoring depressions in an installed foam padding backing adjacent to an installed carpet, said method comprising the steps of:

establishing the size of said depression requiring repair;

making an incision in the installed carpet in the area to be repaired;

admixing two components of a two-component foam in a syringe device and injecting said mixed components between the carpet and the padding in the area of the depression; and restraining the foam resulting from said admixture by placing a weight over the center of said depression, wherein said restrained foam expands to fill the area between the carpet and the depression in the foam padding thereby providing a level foam padding backing and said foam bonds to the foam padding thereby holding itself in place.

* * * * *